Figures 1, 2:
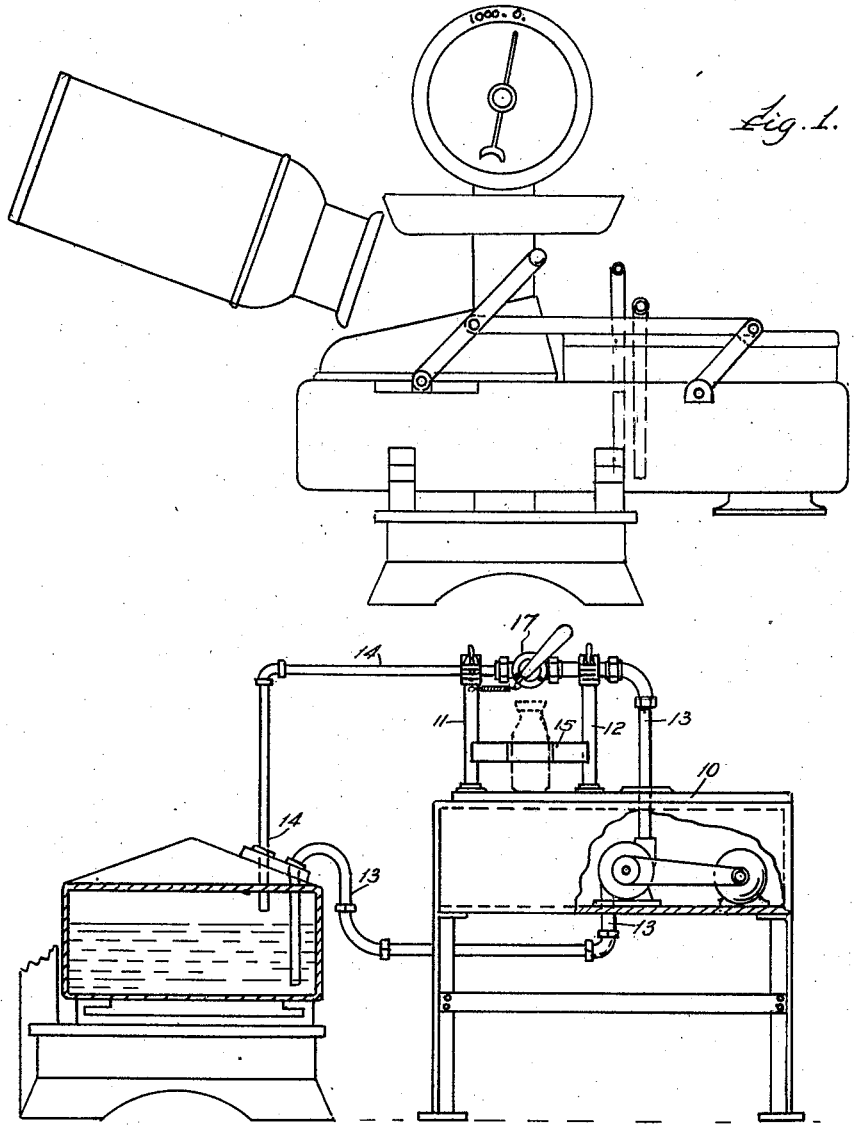

Oct. 5, 1948.    W. S. CAMPBELL    2,450,715
MILK SAMPLER
Filed June 15, 1946    2 Sheets-Sheet 1

Inventor.
Willard S. Campbell
by McKnight and Comstock
Attorney.

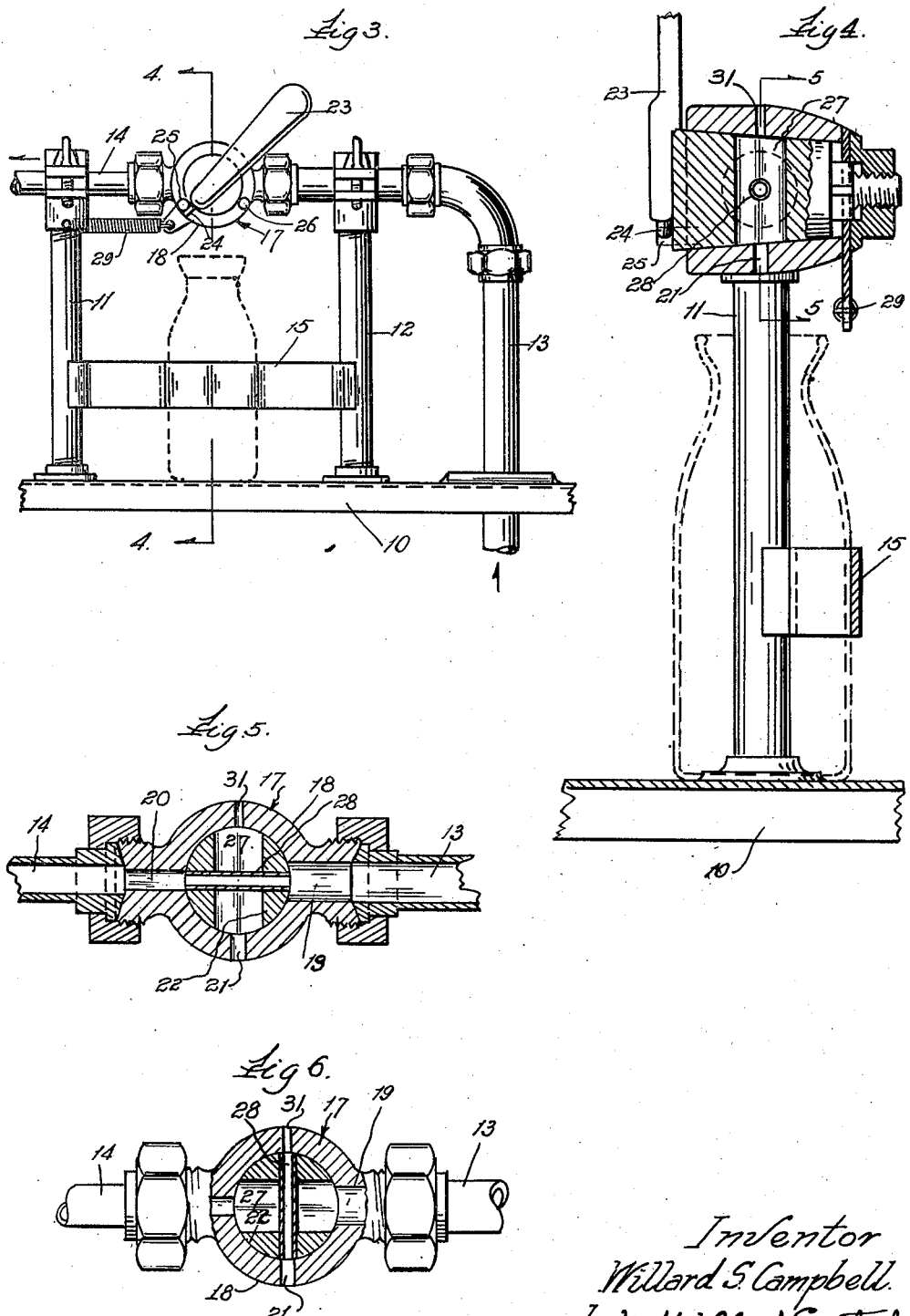

Patented Oct. 5, 1948

2,450,715

UNITED STATES PATENT OFFICE 2,450,715

MILK SAMPLER

Willard S. Campbell, Chicago, Ill., assignor to M & C Conveyors, Inc., Chicago, Ill., a corporation of Illinois Application June 15, 1946, Serial No. 677,068

2 Claims. (Cl. 73—424)

My invention relates to a milk sampler which will furnish an accurate and representative sample from each can of milk passing through a dairy.

Among the objects of my invention is to provide a milk sampler which will provide accurate samples taken from each can of milk handled by a dairy without interfering in any way with the speed or operation of the milk handling. It is customary in a dairy to move the milk cans along a mechanical conveyor and automatically dump each can of milk into a weigh can which is mounted on a scale. It is desirable for many reasons to have a true and accurate sample of each can of milk which is received and handled in this manner. It is an object of my invention to furnish a sampler which will work in cooperation with such apparatus without in any way interfering with the process described and without any halt or delay while the sample is obtained. It is a further object of my invention to provide a milk sampler which is simpler and more economical in construction and operation than previous devices of this nature.

My invention also contemplates such other objects, advantages, and capabilities as will later more fully appear and which are inherently possessed by my invention.

While I have shown in the accompanying drawings, a preferred form of my invention, yet I wish it understood that the same is susceptible of modification and change without departing from the spirit of my invention.

Referring to the drawings, Fig. 1 is a front elevational view of the milk scale and weigh can with sampler pipes broken off; Fig. 2 is a detailed sectional view of my milk sampler; Fig. 3 is a front elevational view of the valve assembly and supports; Fig. 4 is a detailed sectional view of the valve assembly and supports enlarged on line 4—4 of Fig. 3; Fig. 5 is a detailed sectional view through the valve on line 5—5 of Fig. 4 with the valve in sampling position; and Fig. 6 is a detailed sectional view through the valve on line 5—5 of Fig. 4 with the valve in normal position.

The embodiment selected to illustrate my invention comprises a base 10, adapted to support a plurality of sample bottles, one of which is shown in the drawings in dotted lines. Extending upwardly from base 10 are parallel supports 11 and 12, which are connected at their lower ends to base 10 and at their upper ends furnish support for milk inlet pipe 13 and milk outlet pipe 14. Extending transversely to said supports 11 and 12 and connected at each end thereto is a bottle stop 15.

Milk inlet pipe 13 leads from a weigh can, which is shown in the drawings, to valve assembly 17. Milk outlet pipe 14 leads from valve assembly 17 through a positive pump and then back to the weigh can. The positive pump, as shown, may be of any suitable construction designed to provide a continuous flow of milk from the weigh can through milk inlet pipe 13, valve assembly 17, milk outlet pipe 14 and back to the weigh can. The positive pump is kept in constant operation while my sampler is in use.

Valve assembly 17 comprises a stationary body member 18 having four openings. These are milk inlet 19 which connects to milk inlet pipe 13, milk outlet 20 which connects to milk outlet pipe 14, and sampling outlet 21, which is positioned at a right angle to milk inlet 19 and milk outlet 20, and permits the flow of milk downward into a milk bottle positioned on base 10. Bottle stop 15 is so positioned as to permit the easy placing of a sample bottle on base 10 directly beneath sampling outlet 21.

Mounted within body member 18 of valve assembly 17 is a rotatable member 22. Integral with rotatable member 22 and extending outwardly therefrom on one side of valve assembly 17 is a handle 23, which permits manual control of the rotation of rotatable member 22. Extending outwardly from rotatable member 22 on the same side and in the opposite direction from handle 23 is a stop member 24. Extending outwardly from stationary body member 18 of valve assembly 17 are two stop pins 25 and 26, so positioned as to block the rotation of rotatable member 22 by preventing further movement of stop member 24.

Extending through the portion of rotatable member 22 which is positioned within body member 18 of valve assembly 17 is a passage 27, substantially the same diameter as milk inlet 19. Passage 27 extends from milk inlet 19 to milk outlet 20 when handle 23 of valve assembly 17 is in normal position. Normal position is shown in the drawings as when stop member 24 bears against stop pin 25. Extending transversely on a vertical plane to passage 27 is a tube 28, which is of substantially smaller diameter than passage 27 and milk inlet 19, and the same diameter as milk outlet 20.

Thus, with handle 23 of valve assembly 17 in normal position, milk is drawn by the positive pump from the weigh can through milk outlet pipe 14, through milk inlet 19, through passage 27, passing around tube 28 and then out milk outlet 20. Because milk outlet 20 is of smaller diameter than milk inlet 19, passage 27 becomes filled with milk. When handle 23 is rotated in a counter-clockwise manner until stop member 24 bears against stop pin 26, the positions of passage 27 and tube 28 are interchanged. Then the milk entering valve assembly 17 through milk inlet 19 passes through tube 28 and out milk outlet 20, while the milk in passage 27 flows out sampling outlet 21 into the sample bottle placed therebelow. An air intake 31 permits air to enter passage 27 as the milk flows out.

The size of passage 27 is determined by the quantity of milk to be taken as a sample, and usually varies between 10 and 20 cc.

Tube 28, while shown in the drawings as vertical when valve assembly 17 is in sampling position, may be positioned at an angle slightly off from the vertical in order to prevent milk trapped in tube 28 from flowing through sampling outlet 21. This may be done by varying the angle of tube 28, the position of stop pin 26, or both.

When handle 23 is in the sampling position described above, valve assembly 17 permits the flow of milk to continue through tube 28 and through the normal circuit, so as to avoid damage to the positive pump, which would result if this flow were completely cut off.

In order to simplify the operation of handle 23, a coil spring 29 is attached to one end to support 11 and at the other end to loop 30, which extends outwardly from rotatable member 22 of valve assembly 17 on the opposite side from handle 23. Coil spring 29 thus tends to hold handle 23 in normal position until pressure is exerted to move and hold handle 23 in sampling position. As soon as this pressure is released, coil spring 29 causes handle 23 to return immediately to normal position.

In operation, my sampler permits a sample to be taken at any time from the first moment when the milk enters the weigh can. This sample may be taken without in any way interfering with the normal milk handling and weighing process. The constant circulation of milk from the weigh can through the sampler provides agitation in the weigh can, which further insures the selection of a representative sample of the milk in the weigh can.

In order to simplify the construction of my sampler, I may eliminate supports 11 and 12 and use vertical extensions of milk inlet pipe 13 and milk outlet pipe 14 in order to support valve assembly 17 above the milk sample bottle.

Having thus described my invention, I claim:

1. A milk sampler valve comprising a stationary body member having a milk inlet, a milk outlet of smaller diameter than said milk inlet substantially opposite from said sampling outlet, a sampling outlet and an air inlet, a rotatable member mounted within said stationary member, said rotatable member having a passage and a tube of smaller diameter than said passage and substantially transverse to said passage, and means for drawing a continuous flow of milk through said sampler valve from a source of milk to be sampled, said passage of said rotatable body member adapted to permit the continuous flow of milk from said milk inlet through said passage and said milk outlet when said rotatable member is in one position, said rotatable member manually rotatable to another position, said passage adapted upon said rotation to permit the flow of milk from said passage through said sampling outlet and said tube adapted to permit the continuous flow of milk from said milk inlet through said tube and said milk outlet.

2. A milk sampler valve comprising a stationary body member having a milk inlet, a milk outlet of substantially smaller diameter than said milk inlet and diametrically opposite from said milk inlet, a sampling outlet substantially transverse to said milk inlet and milk outlet, an air inlet diametrically opposite from said sampling outlet, a manually rotatable member mounted within said stationary body member, said rotatable member having a passage extending therethrough connecting said milk inlet and milk outlet, said rotatable member having a tube of substantially smaller diameter than said passage extending therethrough transversely to said passage, and means for drawing a continuous flow of milk through said sampler valve from a source of milk to be sampled, said passage adapted to permit the continuous flow of milk from said inlet, through said passage and said milk outlet, said milk outlet adapted by its smaller diameter to cause said passage to become filled with milk, said rotatable member manually rotatable substantially 90°, said passage adapted upon said rotation of said rotatable member to contact said sampling outlet and air inlet and to provide a quantity of milk for a sample, said tube adapted upon said rotation of said rotatable member to contact said milk inlet and milk outlet and to permit the continuous flow of milk through said sampler valve.

WILLARD S. CAMPBELL.

REFERENCES CITED

The following references are of record in the file of this patent:

UNITED STATES PATENTS

| Number | Name | Date |
|---|---|---|
| 508,365 | Bothwell | Nov. 7, 1893 |
| 1,534,958 | Huss | Apr. 21, 1925 |
| 1,562,121 | Newton | Nov. 17, 1925 |
| 2,217,855 | Bassler | Oct. 15, 1940 |
| 2,240,888 | Hageline | May 6, 1941 |